United States Patent [19]

Helser

[11] Patent Number: 4,523,955

[45] Date of Patent: Jun. 18, 1985

[54] HYDROUS CALCIUM SILICATE INSULATION PRODUCTS MANUFACTURED BY RECYCLING GREENWARE

[75] Inventor: Jerry L. Helser, Hebron, Ohio

[73] Assignee: Owens-Corning Fiberglas Corporation, Toledo, Ohio

[21] Appl. No.: 606,315

[22] Filed: May 2, 1984

Related U.S. Application Data

[62] Division of Ser. No. 944,540, Sep. 21, 1978, Pat. No. 4,477,397.

[51] Int. Cl.$^3$ ................................................ C04B 1/00
[52] U.S. Cl. ........................................ 106/120; 252/62
[58] Field of Search ..................... 106/120; 501/154; 252/62

[56] References Cited

U.S. PATENT DOCUMENTS

| | | |
|---|---|---|
| 3,501,324 | 3/1970 | Kubo et al. ........................ 106/120 |
| 3,574,113 | 4/1971 | Shannon ........................ 106/120 X |
| 4,128,434 | 12/1978 | Pusch ................................ 106/120 |
| 4,144,121 | 3/1979 | Otouma et al. ................. 106/120 X |
| 4,162,924 | 7/1979 | Kubo et al. ........................ 106/120 |
| 4,298,561 | 11/1981 | Uchida et al. ................. 106/120 X |
| 4,334,931 | 6/1982 | Asaumi et al. ..................... 106/120 |

*Primary Examiner*—G. L. Kaplan
*Assistant Examiner*—Nam X. Nguyen
*Attorney, Agent, or Firm*—Ronald C. Hudgens; Patrick P. Pacella

[57] ABSTRACT

Off-size greenware (the product resulting from the initial gelation and filter pressing of calcareous and siliceous materials in an aqueous slurry) is recycled. The greenware is pulverized into a desirable size and combined with new calcareous and siliceous materials in the initial slurrying step. The slurry containing recycled greenware gels at an improved rate.

2 Claims, No Drawings

HYDROUS CALCIUM SILICATE INSULATION PRODUCTS MANUFACTURED BY RECYCLING GREENWARE

This is a division of application Ser. No. 944,540, filed 9/21/78 now U.S. Pat. No. 4,477,397.

NATURE OF THE INVENTION

This invention relates to the manufacture of hydrous calcium silicate insulating products from slurried calcareous and siliceous components.

BACKGROUND OF THE INVENTION

The term hydrous calcium silicate denotes a crystalline compound formed by the reaction of lime (CaO), silica ($SiO_2$), and water ($H_2O$). The two hydrous calcium silicates that generally are of interest are: tobermorite having the formula $4CaO.5SiO_2.5H_2O$; and xonotlite, having the formula $5CaO.5SiO_2.XH_2O$. Hydrous calcium silicate products often are used as heat insulation materials.

Methods for reacting and drying a molded aqueous slurry of reactive cementitious constituents and reinforcing fibers to form hydrous calcium silicate insulation products are known in the art. One such method includes placing a molded slurry of the reactive cementitious constituents and reinforcing fibers in an autoclave, introducing pressurized saturated steam into the autoclave to indurate the slurry, and removing the products from the autoclave. Another such method includes placing a molded slurry of the reactive cementitious constituents and reinforcing fibers in an autoclave, introducing pressurized saturated steam into the autoclave to indurate the slurry, simultaneously further indurating and drying the slurry with superheated steam to convert the slurry to a final product, reducing the pressure in the autoclave to atmospheric pressure and removing of the product.

In practice the principal slurry constituents, i.e. calcareous and siliceous materials, reinforcing fibers and water are mixed to form a slurry which is then molded to impart a predetermined shape to the slurry and final product. The slurry is molded or shaped in any convenient manner. Generally, however, one of two types of molds is employed, i.e. pan molds or filter press molds. In pan molds, the slurry remains in the mold while the cementitious materials are reacted to convert them to a hydrous calcium silicate insulation. A pan mold generally defines a mold cavity of a particular shape and dimension; e.g. a flat rectangular pan is used to form flat ware or blocks, while an arcuate, generally U-shaped mold forms half-section insulation pieces used to form molded pipe covering for insulating pipes, ducts, and the like. The filter press mold generally comprises a perforated molding surface over which the slurry is poured. A perforated mechanical piston, complementary in shape to the mold, compresses the slurry and dewaters it to the point where it is self-supporting. The filter press molding technique is conducted in the absence of any applied heat and under pressure sufficient only to express water from the slurry in the filter press and to form solid articles such as pipe covering and flat ware. At this point the molded slurry becomes the product defined as "greenware" in this description. The filter press molding technique is described in U.S. Pat. No. 2,699,097.

The greenware is further cured to the desired hydrous calcium silicate product by several methods. One method introduces pressurized, saturated steam into a closed system or autoclave in sufficient amount to bring the pressure in the autoclave from 100 to 350 psi at a temperature ranging from 328°–406° F. in 30 minutes or less and preferably within 15 to 30 minutes after the introduction of the steam begins. (The term "pressure" as used herein refers to gauge pressure (in pounds per square inch), i.e. the pressure above that of the atmosphere.).

The greenware is then maintained under this steam pressure in an autoclave for a period of time sufficient to indurate it. After the product has been removed from the autoclave, it can be dried in an auxiliary drier, if required. The drying temperature in the auxiliary drier must be below the decomposition point of the organic fiber reinforcement to achieve the best possible strength of the product.

The other method disclosed herein introduces pressurized, saturated steam into a closed system or autoclave in sufficient amount to bring the pressure in the autoclave from 100 to 350 psi in 30 minutes or less and preferably within 15 to 30 minutes after the introduction of steam begins. (The term pressure as used herein refers to gauge pressure (in pounds per square inch), i.e. the pressure above that of the atmosphere.) After the introduction of the steam, the temperature in the autoclave is raised by heating coils to a temperature ranging from about 407° to about 600° F. to produce the superheated steam.

The greenware is then maintained in the autoclave until a perdetermined percentage of the moisture (by weight) of the ware has been removed by evaporation into the superheated steam atmosphere. The free moisture is reduced substantially during the cycle, but never drops below 10% by weight of solids during the entire cycle. While continuing to circulate the steam in the system, the pressure in the autoclave is reduced to atmospheric conditions within 60 minutes or less and the final product is removed. The product subsequently can be dried in an auxiliary drier, if required. The drying temperatures in the auxiliary drier must be below the decomposition point of the organic fiber reinforcement, or a brittle product is obtained. The retention of at least 10% by weight-free moisture in the molded slurry allows for simultaneous indurating and drying in an autoclave at temperatures above the decomposition point of the reinforcing organic fibers.

An important step in the overall process is the gel formation step prior to molding the slurry. After a mixture of pulverized siliceous and calcareous materials are suspended in an aqueous slurry sufficient time must be allotted for the slurry to gel before it can be processed further. This period of gelation is necessary to permit the formation of a thickened slurry. Gelation requires alternate quiescent periods for allowing the formation of nucleated solids followed by gentle agitation.

I have now discovered that the addition of pulverized greenware material derived from the initial filter press molding of the slurry in the absence of applied heat substantially decreases the amount of time required for this preliminary gelation step.

SUMMARY OF THE INVENTION

Briefly stated, this invention comprises a process for making hydrous calcium silicate insulation products from aqueous slurries of calcareous and siliceous materials comprising:

(a) preparing a water dispersion of reactive calcareous and siliceous containing materials;

(b) gelling the dispersion by heating at a temperature of approximately 180°–210° F.;

(c) molding said partially gelled dispersion under pressure and expressing water therefrom thereby converting the gelled dispersion to greenware;

(d) unmolding said greenware and selecting those greenware articles to be recycled;

(e) completing the curing of the remaining molded articles;

(f) pulverizing selected greenware articles from step (d) and adding said particulated material to the dispersion of step (a) in a subsequent cycle of the process.

DESCRIPTION OF THE INVENTION

The specific lime to silica ratio of the slurry is dependent primarily upon the desired type of crystalline hydrous silicate desired in the final product. For example, if it is desired to obtain a crystalline product predominantly composed of a crystalline matrix structure of the type commonly referred to as xonotlite ($5CaO.5SiO_2.XH_2O$), a $CaO/SiO_2$ mol ratio of approximately 1/1 would be utilized in the slurry. If the desired cyrstalline product is tobermorite having the formula $4CaO.5SiO_2.5H_2O$, a $CaO/SiO_2$ mol ratio ranging from 0.75/1 to 0.80/1 would be employed in the slurry. In general, the $CaO/SiO_2$ molar ratio ranges from 0.65/1 to 1.3/1.

Control of the density of the resultant product is primarily accomplished by controlling the relative amount of water utilized in the make-up of the slurry. For example, an apparent density of 11 pounds per cubic foot, which may be considered a nominal apparent density, would be obtained utilizing a slurry having a ratio of water to total dry solids of approximately 6:1.

The siliceous materials employed in this invention include portland cement, siliceous sand, quartz, diatomaceous earth, clays, silica gel, pozzolana, perlite, and the like and mixtures thereof.

The calcareous materials used in this invention include portland cement, quick lime, slaked lime and the like and mixtures thereof.

The organic materials of this invention are cellulosic fibers such as fibers of pulp fiber, cotton, straw, bagasse, wood flour, hemp, rayon and the like. A preferred pulp fiber is bleached softwood pulp. Alkali-resistant glass fibers can be employed with the cellulosic material.

In the method of this invention the cementitious materials noted above in water are mixed in a hydrapulper to form a slurry and the pulverized particulated greenware from a previous cycle is added to the slurry composition. The slurry is transferred to a holding tank fitted with an agitator and preferably maintained at a temperature ranging from 60° to 90° F. The addition of the particulated greenware has the effect of shortening the length of time required for the slurry to reach the proper consistency for further processing. The particulated greenware is added in an amount up to about 30% by weight of the total solids material. Preferably, it is added in an amount between about 10 and 20 percent of the total weight of the solids. A maximum particle size is ¼ inch mesh size. The incorporation of this material into the gel mixture now reduces the gelation time from an average, for example, of 105 minutes to 70 minutes. This is, of course, a substantial reduction in the gelation time required.

After the slurry has gelled to a proper consistency it is molded into articles by filter press molding techniques. This technique is well known to those skilled in the art and as noted previously comprises molding the slurry under sufficient pressure to express some of the water therefrom and to provide solid articles which are the greenware of this description. These solid articles are inspected and those articles found not to be suitable because of breakage or undesired dimensions are removed and pulverized to a particle size of not greater than ¼ inch mesh size.

This molded slurry (greenware) is then subjected to pressurized saturated steam in a closed system or autoclave in an amount sufficient to bring the pressure in the autoclave to 100 to 350 psi at a temperature ranging from 328° to 406° F. in 30 minutes or less and preferably within 15 to 30 minutes after the introduction of the steam begins. The term "pressure" is pounds per square inch, gauge. The slurry is maintained under this pressure for a period of time sufficient to indurate the slurry. Curing to form the final desired hydrated calcium silicate product is completed by additional heating, for example with superheated steam at 407° to 600° F., or other temperatures as will be known to those skilled in the art.

EXAMPLE

A low density hydrated calcium silicate heat insulation material is made from the following materials, in parts by weight of solids.

| MATERIALS | PARTS BY WEIGHT (Dry) |
| --- | --- |
| Quick lime | 34.78 |
| Diatomaceous earth (86 sq. ft. per gram) | 21.4 |
| Diatomaceous earth (54 sq. ft. per gram) | 29.96 |
| Wood pulp | 6.5 |
| Glass and Rayon fibers | 1.06 |
| Particulated recycled greenware | 6.29 |

A dispersion of the various materials is made by dispersing the wood pulp in 350 parts by weight of water heated to 200° F. in a hydrated pulper to produce a dispersion. This dispersion of the wood pulp is then added to a premixer wherein the hydrated lime is added and mixed for 1 minute. Another 900 parts by weight of water at 200° F. is added to another premixer and the diatomaceous earth and pulverized greenware is added thereto and mixed for 1 minute. Thereafter the contents of the two premixers are added to a gel tank wherein the materials are thoroughly mixed for 10 minutes. The resulting slurry or suspension of ingredients is then premitted to gel and a gelation time of only about 70 minutes is required. The gel so produced is then drawn off in small quantities to a volumetric tank in precise quantities for charging a precision type filter mold shaped to make 3 inch annular pipe insulation of 1½ inch wall thickness and a length of 36 inches. The ram of the mold compresses the gel to force the water out through the cylindrical filter forming the inside surface of the pipe insulation to leave a pipe insulation which is self sustaining and handleable. The block is then removed from the filter mold and now, in its greenware condition is inspected. Unsatisfactory portions are removed. The remaining block is stacked in a rack which when filled is rolled into an autoclave for induration. After the autoclave is sealed, the pressure in the autoclave is raised to 175 psi over a 30-minute cycle and the blocks are subjected to saturated steam at this pressure for 1½ hours. Thereafter the temperature in the autoclave is raised by heating coils to 600° F. to produce superheated steam which slowly dries the blocks over another 2-hour period. The autoclave is then depressurized over a ½-hour period, and the racks which hold the insulation block are removed from the autoclave. The material so produced has a modulus of rupture of 115 psi and a density of 12.5 lbs. per cubic foot.

While the invention has been described in considerable detail I do not wish to be limited to the particular embodiments shown and described and it is my intention to cover hereby all novel adaptations, modifications and arrangements thereof which come within the practice of those skilled in the art to which this invention relates.

What is claimed is:

1. A moldable slurry for manufacturing low density hydrated calcium silicate heat insulating bodies comprising an aqueous slurry of reactive calcareous and siliceous materials and particulated greenware, and produced by a process including the steps of:
    a. preparing a moldable slurry comprising a water dispersion of reactive calcareous and siliceous containing materials;
    b. partially gelling said dispersion by heating at a temperature of approximately 180°–210° F.;
    c. molding said partially gelled dispersion and expressing water therefrom thereby forming rigid greenware articles;
    d. removing portions of said greenware articles selected for recycling to the process;
    e. curing the remaining molded articles by heating and pressurizing; and
    f. pulverizing the selected greenware articles from step d to form particulated greenware and adding said particulated greenware to the composition of step a in a subsequent cycle of the process.

2. The slurry of claim 1 wherein said particulated greenware is present in an amount of between 10 and 30 percent by weight of dry solids.

* * * * *